(12) United States Patent
Quine

(10) Patent No.: US 6,985,408 B2
(45) Date of Patent: Jan. 10, 2006

(54) METHOD FOR DISPLAYING AN ENVIRONMENTALLY MODULATED EXPIRATION DATE

(75) Inventor: Douglas B. Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 7 days.

(21) Appl. No.: 10/890,594

(22) Filed: Jul. 13, 2004

(65) Prior Publication Data

US 2004/0246819 A1 Dec. 9, 2004

Related U.S. Application Data

(63) Continuation of application No. 09/994,333, filed on Nov. 26, 2001, now Pat. No. 6,795,376.

(51) Int. Cl.
- *G04B 47/00* (2006.01)
- *G04B 47/06* (2006.01)
- *G01K 3/00* (2006.01)
- *G08B 1/00* (2006.01)

(52) U.S. Cl. ............ 368/10; 368/11; 368/29; 368/107; 340/309.16; 340/309.7; 374/102

(58) Field of Classification Search ......... 368/9–1, 368/28, 29, 72–74, 107–109; 340/309.16, 340/309.7; 374/100–108; 700/176
See application file for complete search history.

(56) References Cited

U.S. PATENT DOCUMENTS

| | | |
|---|---|---|
| 4,624,578 A | 11/1986 | Green |
| 5,243,579 A | 9/1993 | Potthof |
| 5,332,315 A * | 7/1994 | Baker et al. ............. 374/102 |
| 5,442,669 A | 8/1995 | Medin |
| 5,555,223 A | 9/1996 | Barainsky |
| 6,337,836 B1 | 1/2002 | Eidelson |
| 6,411,567 B1 | 6/2002 | Niemiec et al. |
| 6,445,967 B1 | 9/2002 | Travagline et al. |
| 6,501,390 B1 | 12/2002 | Chainer et al. |
| 6,664,887 B1 | 12/2003 | Fuchs |

* cited by examiner

*Primary Examiner*—Vit W. Miska
(74) *Attorney, Agent, or Firm*—Michael J. Cummings; Charles R. Malandra, Jr.; Angelo N. Chaclas

(57) ABSTRACT

A system and method for dynamically adjusting expiration dates displayed on consumer products, the system and method utilizing an LCD display for displaying an expiration date and messages, sensors for monitoring environmental conditions, a clock for counting back the expiration date, and a controller for determining messages and adjustments to the displayed expiration date based on monitored environmental conditions.

20 Claims, 3 Drawing Sheets

FIG.3

| Product | Factor | Trigger | Linear Phase | Step Phase |
|---|---|---|---|---|
| Ice cream | Air exposure | Open package | Time | Starts with open package |
| Ice cream | Temperature | Above −22F | −22F to +32F | Above freezing |
| Copier toner | Air composition | Open package | - | Nitrogen replaced by air |
| Copier toner | Humidity | Open package | 0%RH to 85%RH | Over 85%RH |
| Copier toner | Temperature | Over 150F | - | Over 150F |
| Copier toner | Temperature | Open package | 80F to 150F | Over 150F |
| Meter ink | Temperature | Below 32F | - | Below freezing |
| Meter ink | Temperature | Over 85F | 80F to 150F | Over 150F |
| Meter ink | Light | Open package | X to Y lumens | Over Z lumens |

METHOD FOR DISPLAYING AN ENVIRONMENTALLY MODULATED EXPIRATION DATE

This application is a continuation of application Ser. No. 09/994,333 filed Nov. 26, 2001, now U.S. Pat. No. 6,795,376.

FIELD OF THE INVENTION

The present invention relates to a system and method for displaying expiration dates for consumer products, and more particularly, relates to an environmentally modulated expiration date display that adjusts the expiration date to reflect changes resulting from environmental factors.

BACKGROUND OF THE INVENTION

Various consumer products have associated expiration dates after which the product is no longer considered effective, or safe, for its intended use. For example, many foods have expiration dates after which the food is no longer considered fresh.

Expiration dates presuppose that a product has been maintained under assumed conditions, which may or may not be the conditions that the product is actually subjected to. In determining an expiration date to pre-print on a product, uncertainty as to how a product will be stored may warrant conservative estimates, especially when use of an expired product may have costly consequences. For example, a medicinal product might reasonably have a long shelf life, but shorter expiration estimates may be appropriate to avoid even a small risk that a patient will not receive a prescribed dosage of medicine.

Another example is ice cream. Ice cream typically has an expiration date one year from manufacture. However, if it is not kept at the required freezing temperature, then the shelf life of the ice cream is drastically reduced. Also, when the container is opened and air is introduced into the container, the environmental conditions change significantly in a manner not accounted for on the preprinted expiration date on the container. Similarly, containers of copier toner, postage meter ink, or cleaning solvents may have significantly altered shelf lives depending on the environmental conditions they experience.

The accuracy of an expiration date is dependent upon the integrity of the product packaging. If the seal on a container fails, the container wall is punctured, or the product is tampered with then the product may become contaminated or deteriorate. In the case of a carbonated beverage or fine wine a breach in the container seal ends the "storage" phase of the product life cycle and initiates the "consumption" phase of the product life cycle in which the expiration date is significantly shortened. The current expiration date system uses static information and does not base the information on the conditions within the container at hand.

Conventional product packaging does not offer dynamic adjustment to the expiration date in response to environmental conditions in a manner that provides credibility and accuracy to the expiration date.

SUMMARY OF THE INVENTION

To meet the shortcomings of the existing art, the present invention provides a method and system for an environmentally modulated expiration date display that adjusts the expiration date to reflect the environmental changes experienced by the product.

The invention preferably utilizes an LCD display with a date (and possibly a time) set to display a future expiration date for a product. In the preferred embodiment, a clock associated with the LCD display is preset to the most remote expected expiration date, under the assumption that the product will be stored under conditions to achieve maximum shelf life. The clock is designed to run in reverse, that is, to run towards a time closer to the present. Sensors detect environmental factors such as temperature, humidity, container seal integrity, and other relevant factors, as the case may be. When preset environmental boundary conditions are met (e.g. the container is opened, or the temperature rises above freezing) the clock starts, causing the displayed expiration date to move towards the present. Fuzzy logic, linear logic, lookup tables, or preprogrammed proportional relationships are used to modulate the clock speed based on deviation of the environmental conditions from preferred values. Alternatively the clock can be preset to an expected expiration date and clock can extend or shorten the expiration date based on whether favorable or unfavorable conditions are present.

The expiration display, according to the present invention, will also provide preset text messages to signify when a product should be used immediately, or whether the product is no longer usable.

The invention also allows for identification of improper shipping conditions (a grocery store can check expiration date on newly delivered product; if ice cream should have a 1 year expiration date but it reports only 3 months then the batch has been warmed in transit and the life shortened). The dynamic expiration dates allow the store to seek compensation from the shipper. It also allows a grocery story to place the food with the shortest life expectancy in the front of the shelf (today this is done by placing the "oldest" stock in the front of the shelf). Storage conditions, however, may have caused other product inventory to have the least remaining shelf life. Rotation of the stock is based on actual shelf life not the static date.

The expiration date display of the present invention may also be used to advise that the product has experienced a temporary condition that makes it unfit for current use. The display can also report when a product that is not yet ready for use becomes ready, or when a product reaches peak quality for consumption.

In addition to monitoring environmental conditions, the present invention may also be used detect the condition of the product itself, and to determine whether the product is in a condition that is no longer usable. For example, products like milk, juice, or wine become sour when they "go bad." The present invention can monitor the pH of product and report when it is starting to pass its prime, and when it is no longer usable.

Thus an advantage of the present invention is that accurate expiration dates can be provided on products. When products are exposed to adverse environmental conditions the displayed expiration date changes to reflect those conditions. When threshold events, such as breaking a seal on the package occur the predicted shelf life and expiration date are adjusted and displayed accordingly.

It will also be apparent that the present invention may be applicable for tamper detection. Where conventional packaging offers simple protection against tampering, such as a non-reusable foil seal, the present invention can enhance tamper detection by monitoring conditions of the package. For example, an embodiment of the present invention that detects that a vacuum seal has been broken for the purposes of expiration date modification, may also be used for tamper detection, even where a container has been breached at a location other than the tamper resistant foil.

DESCRIPTION OF THE DRAWINGS

The above and other objects and advantages of the present invention will become more readily apparent upon consideration of the following detailed description, taken in conjunction with accompanying drawings, in which like reference characters refer to like parts throughout the drawings and in which:

FIG. 3 is a table providing exemplary environmental conditions that trigger expiration date adjustments for different products.

DETAILED DESCRIPTION OF THE PREFERRED EMBODIMENTS

Figure 1:
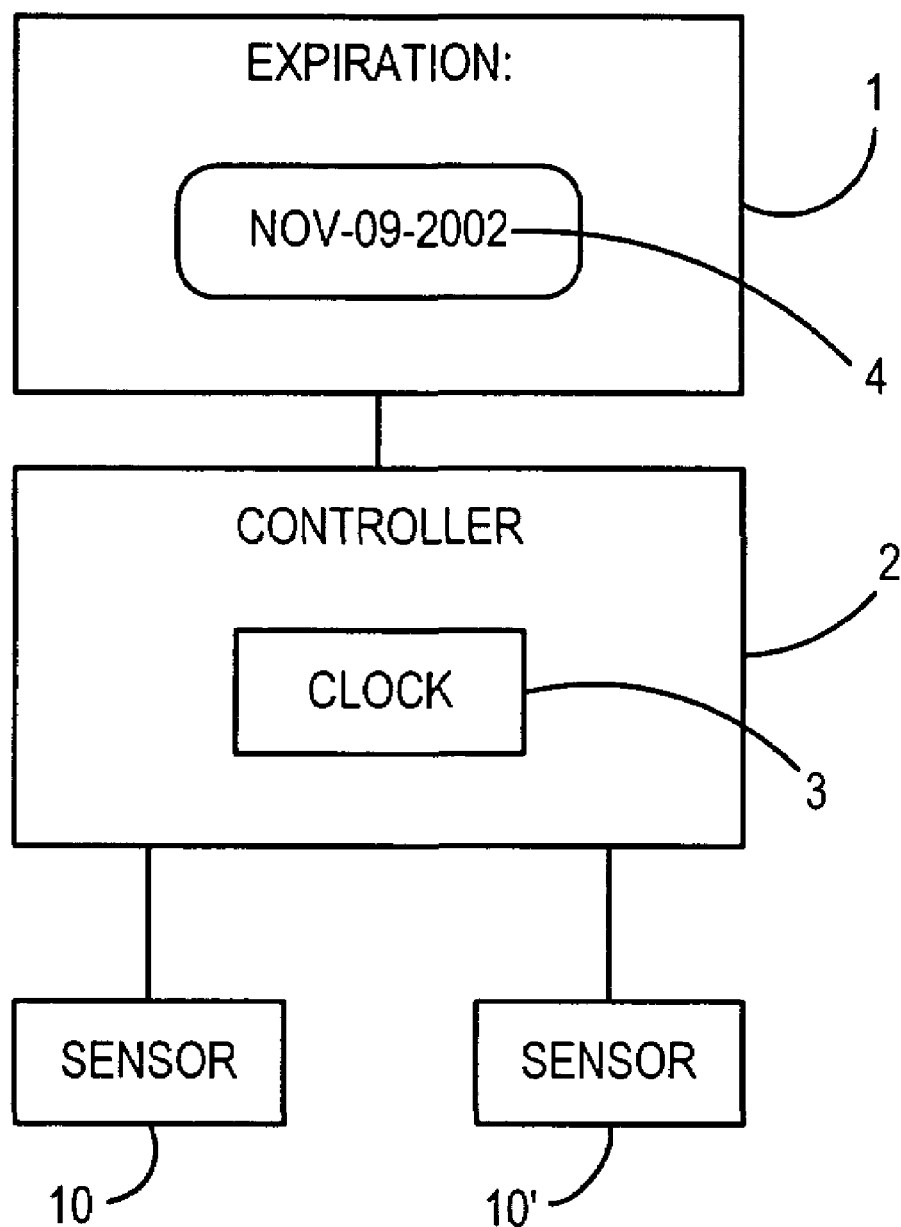
FIG. 1 depicts a preferred system for displaying environmentally modified expiration dates.

A system for implementing the display of environmentally modified expiration dates is depicted in FIG. 1. LCD display 1 is mounted on the package of the respective product for which an expiration date 4 is displayed. The expiration date 4 is typically a day, but if greater accuracy is required, it may also include a time. LCD 1 is preferably comprised of any well-known inexpensive LCD display, for example of the type used in inexpensive digital watches. The expiration date 4 is controlled and modified by a signal from controller 2 which includes a clock 3.

Controller 2 receives sensor signals from one or more sensors 10. Sensors 10 may include temperature sensors, humidity sensors, pressure sensors, or trip switches. Each of these different kinds of sensors detects different environmental conditions relevant to the expiration date of the product. Based on the sensor signals received from sensors 10, controller 2 adjusts the expiration date 4 shown on LCD display 1.

Controller 2 is preset when the product is packaged to cause the display of a predetermined expiration date 4. Controller 2 is also preprogrammed to recognize environmental trigger conditions while monitoring sensors 10. Upon detecting an environmental trigger condition, controller 2 adjusts the expiration date 4.

Such an environmental trigger point may cause a one time adjustment to the expiration date. For example, upon opening a vacuum sealed package, the product will no longer have the benefit of the preserving properties of vacuum, and a one time expiration date adjustment may be appropriate. Thus where a product may have had one year of shelf life left before the package is opened, controller 2 can be preprogrammed to recognize that its effective shelf life is now one month, and the expiration date 4 can be reduced accordingly.

Adjustments to the expiration date 4 may also be continually made for as long as the product is being subject to the triggering environmental conditions. For example, for as long as a frozen product is exposed to above freezing temperatures, the prospective shelf life may become shorter and shorter, until the product is returned to a freezing environment. For this kind of expiration date adjustment, the present invention preferably uses clock 3 to count downwards from the previous expiration date towards the present at a predetermined rate. When the preset limits are exceeded (e.g. the container is opened, or the temperature rises above freezing) the clock 3 is started, causing the preset expiration date to move towards the present. Thus, based on the modulated clock 3 output during the adverse environmental condition, an appropriate adjustment is made to the expiration date 4 to be displayed.

The invention preferably uses small and inexpensive device components. Inexpensive sensors for pressure, pH, temperature, humidity, and continuity are readily available in very small form factors may be used for sensors 10. Medical advances in diagnostic techniques (e.g. instant test for strep throat) have resulted in very cost effective rapid reading detectors for various pathogens. For controller 2 and display 1, advances in calculator technologies and digital wrist watches have resulted in controllers and digital displays that cost less than a dollar in consumer implementations, are completely sealed, and run using tiny "button" or flexible flat format batteries for years. These devices may be manufactured as small self contained devices that are embedded in the product container wall or cover; they may be attached on top of the package (like the antitheft security tags at department stores), or they may be built into the package.

With current technologies to build circuits, the container could be used as the substrate with circuitry deposited upon the substrate and covered with a laminate. A battery might become an element in the package structure. The devices could be programmed to reset when the power was removed or a new battery installed. This would allow reinitialization and reuse. The devices could have a series of "switch" selectors to determine the sensors being used and the lookup table algorithms to activate. In that way a single device could be made and the application set by configuration at the installation point. For example, a first terminal might be used to set the year, a second terminal to set the month, a third terminal to set the day, a fourth terminal to sets the program mode—ice cream or beer, and a fifth terminal to set the the duration. Each terminal could be jumpered/wired to various option settings. Alternatively, memory in the device could be loaded with the specific program, including dates, algorithms, sensor controls at initialization.

The parameter(s) being sensed by sensors 10 will determine the sensing interface to the product. A temperature sensor may be attached to the outside wall of the container or the temperature probe may be within the container. A pressure sensor may be sealed inside the container or it may sense changes in a flexible section of the container from the outside (a microscopic vacuum pop-up button on a container). The pH may be sensed directly inside the container or a semipermeable membrane may allow a sensor to sample the gasses within the container while the sensor is separated from the contents in a separate small pocket of the container.

Figure 2:
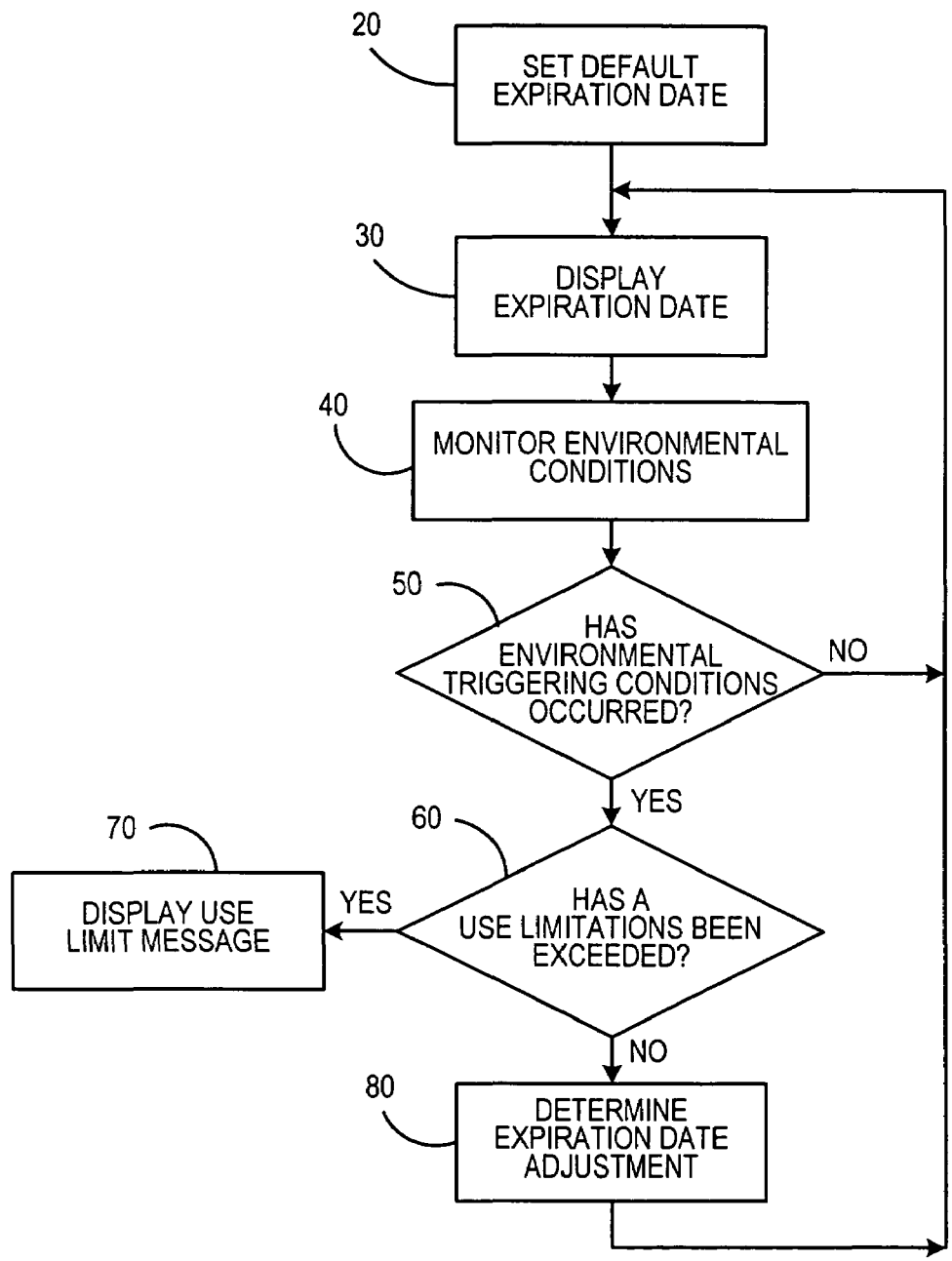
FIG. 2 depicts a flowchart depicting a preferred mode of operating the system of the present invention.

Further features of the operation of the present invention can be seen with reference to the operational flow chart of FIG. 2. At initial step 20, a default expiration date is preset into controller 2 to be displayed by LCD 1. This default expiration date is preferably set by assuming that the product is kept under conditions favorable to extending the shelf life of the product. As the product is being stored and/or used, the expiration date 4 is continuously displayed pursuant to step 30 of FIG. 2. At step 40, sensors 10 are monitored and sensor signals indicating environmental conditions are provided to the controller 2. As it monitors the one or more sensors 10, the controller 2, at step 50, determines whether an environmental triggering condition has occurred that necessitates an adjustment to the expiration date. If no triggering condition exists, then no action is taken and the operational flow continues to loop the display and monitoring steps 30 and 40.

As an alternative to an LCD display 1, the expiration date may be displayed on a plasma display, an LED display, or any other display that can represent data to an observer. LCD display 1, also need not be directly mounted on the product packaging, or hard wired to controller 2. Rather, display 1 can be a part of a remote viewing station, or part of a hand held device that receives radio frequency signals from the controller 2 instructing what expiration date 4 should be displayed. For the hand held embodiment of display 1, a single display may be used to show the expiration date 4 for many different containers implementing the present invention. In operation, the hand held LCD display 1 would show the expiration date 4 for a package to which the hand held display unit is being proximally held. Thus every package need not have its own display and a hand held or remote view can be used to check various units as desired.

If an environmental triggering condition has occurred, at step 60 the controller 2 determines whether any use limitations have been exceeded. For example, at this step the controller 2 determines the product has been ruined by excessive moisture based on a sensor input from a moisture sensor 10. Controller 2 is preprogrammed to recognize that certain conditions may render the product immediately unusable, or that the product will become unusable unless used immediately. Accordingly, if there is a use limitation, then at step 70 controller 3 will cause a use limit message to appear at on the LCD display 4. For example such a message may say "UNFIT" to convey that the product is no longer usable, or "USE NOW" to convey that the product will no longer be usable in the near future.

If no use limitations have been exceeded, then controller 2 proceeds to step 80, where an appropriate modification to the expiration date is determined in response to the monitored triggering environmental condition. As discussed above, a trigger point may cause a one-time adjustment to the expiration date. Such adjustment responses are preprogrammed into controller 2. Alternatively, at step 80, an ongoing triggering condition can result in the activation of clock 3, which will run backwards from the previous expiration date at a rate that is determined in accordance with tables and/or logic preprogrammed into controller 2. The rate of change of the expiration date by controller 3 can be made to be proportional to, or otherwise a function of, the magnitude of the measured environmental condition away from a preferred environmental condition. For simplicity, it is preferred that there be a linear correlation between the magnitude of the deviation from the preferred conditions and the rate of adjustment of the expiration date.

While the preferred embodiment described herein, uses the clock 3 to count down the expiration date, the invention may also be used to extend the expiration date if it is determined that the product is being subject to conditions favorable towards extending shelf life. The determination of the range of favorable conditions is dependent on the nature of the product. For the example of ice cream freezing is good and melting is bad, while in the case of milk or beer freezing or warming can be unfavorable. Thus for some products there may only be a middle range of conditions which are considered favorable, and such ranges are programmed into controller 2.

Examples of triggering conditions for some exemplary products are shown in the table in FIG. 4. In FIG. 4, examples are given for three products, ice cream, copier toner and postage meter ink. For each of these products different triggering environmental factors for potentially adjusting expiration date are identified. The "Trigger" column identifies an event sensed by sensors 10 which will identify that a change should be made to the expiration date. The "Linear Phase" column identifies a range of measured environmental conditions for which a variable rate of change of the expiration date will be adjusted, where applicable. In FIG. 3, a linear correlation of the adjustment to the range of environmental values is preferred, however the invention may utilize any other relationship that suits the particular products. For example, a look-up table may be implemented based on empirical data collected about the particular product. The "Step Phase" column of FIG. 3 identifies environmental conditions that may be used to trigger a one-time "step" expiration date adjustment, or to trigger a use limitation message.

As a further example of a type of sensor 10 to be used with the present invention, a sensor for determining whether the seal on a package has been opened may be used. Under this embodiment of a sensor 10, a conductive wire is broken when the package is opened. Upon sensing that the conductive wire has become an open circuit, controller 2 may then take appropriate action, such as shifting the adjustment of the expiration date from a long term storage mode, to a short term storage mode. This change in mode may result in a use limitation message, a one-time expiration date adjustment, or may cause the controller 2 to consult a different formula or table for determining an appropriate rate for adjusting expiration date 4.

Another exemplary sensor 10 is applicable for determining whether a frozen material has melted. In this embodiment, a spring-biased contact is positioned within, or contiguous with, the frozen material. When the material melts, the contact is allowed to move. The controller 2 detects the change in the state of the contact and takes appropriate action, such as shifting the adjustment of the expiration date from a long term storage mode, to a mode taking into account that melting has occurred.

For determining environmental trigger conditions and expiration date adjustments to program into controller 2, health department information can be used for foods and materials analysis may be used for other products (light exposure weakens plastic rope, humidity cases certain products to lose efficacy). There is extensive information about the required storage conditions for food (milk must be stored between temperature X and temperature Y) with good data regarding the consequences of storage outside those ranges. Milk's shelf life drops by Z days when stored 5 degrees above the recommended temperature and the shelf life is hours when the temperature is above a certain temperature. Finally there are defined temperatures above which food is considered unsafe for consumption.

A device implementing the present invention can be deployed at the individual container level (½ gallon ice cream container), at the consumer bundle level (case of beer), or at the bulk level (grocery store shipping pallet). Cost/benefit and marketing considerations will determine the best level of monitoring. Premium ice cream providers would certainly find deployment of this device on every package as being cost effective and a customer assurance benefit. Commodity items might be tagged at the "6 pack" or case level. Accordingly, when the present application makes reference to a "product," the term may apply to individual packages or a unit group of individual packages.

Any of the components including the controller 2, display 1, sensor 10 or battery (not shown) could be recycled, possibly for a deposit amount such as five or ten cents, such as is normal for states having bottle and can return policies. Bulk shippers might use these devices on pallet shipments to grocery stores.

Although the present invention has been described with emphasis on particular embodiments, it should be understood that the figures are for illustration of the exemplary embodiment of the invention and should not be taken as limitations or thought to be the only means of carrying out the invention. Further, it is contemplated that many changes and modifications may be made to the invention without departing from the scope and spirit of the invention as disclosed.

What is claimed is:

1. A method for dynamically displaying and adjusting a product expiration date comprising the steps of:
   attaching an expiration date display to a product, the expiration date display identifying the expiration date for the product;
   setting a default expiration date for the expiration date display;
   sensing one or more environmental conditions relevant to expiration of usefulness of the product;
   adjusting the expiration date on the expiration date display responsive to the one or more sensed environmental conditions;
   further including the step of setting an environmental condition trigger point, and wherein the step of adjusting the expiration date includes commencing with said adjusting the expiration date upon sensing that the one or more environmental conditions have reached the environmental condition trigger point.

2. The method of claim 1 wherein the step of sensing one or more environmental conditions includes sensing opening of a container.

3. The method of claim 2 wherein the step of sensing opening of the container includes sensing that an electrical circuit has been broken by opening the container.

4. The method of claim 1 wherein the step of adjusting the expiration date includes extending the expiration date and shortening the expiration date depending on the sensed environmental condition.

5. The method of claim 1 wherein the step of setting the default expiration date includes selecting the default expiration date by assuming that the product will not be subjected to adverse environmental conditions.

6. The method of claim 5 wherein the step adjusting the expiration date includes counting down the expiration date with a clock when an adverse environmental condition is sensed.

7. The method of claim 6 wherein the step of counting down the expiration date includes modulating the clock speed based upon fuzzy logic, linear logic, or lookup tables as a function of the one or more sensed environmental conditions.

8. The method of claim 7 wherein the step of counting down the expiration date with a clock includes adjusting the rate of counting down as a function of a magnitude of the adverse environmental condition.

9. The method of claim 7 wherein the step of counting down the expiration date with a clock includes adjusting the rate of counting down as a function of the duration of the adverse environmental condition.

10. An apparatus for dynamically displaying and adjusting a product expiration date, the apparatus comprising:
    a display showing the expiration date for the product;
    one or more sensors for sensing one or more environmental conditions relevant to expiration of usefulness of the product; and
    a controller coupled to the display and the one or more sensors, the controller adjusting the expiration date on the expiration date display responsive to the one or more sensed environmental conditions;
    wherein the controller is programmed with an environmental condition trigger point, and the controller adjusts the expiration date when the one or more sensors sense that the one or more environmental conditions have reached the environmental condition trigger point.

11. The apparatus of claim 10 wherein the controller adjusts the expiration date responsive to the sensors sensing opening of a container.

12. The apparatus of claim 11 wherein the one or more sensors include an electrical circuit positioned to be broken by opening of the container.

13. The apparatus of claim 10 wherein the controller further comprises a clock that counts-down the expiration date at a predetermined clock speed when an adverse environmental condition is sensed.

14. The apparatus of claim 13 wherein the clock speed is modulated by the controller based upon fuzzy logic, linear logic, or lookup tables as a function of the one or more sensed environmental conditions sensed by the one or more sensors.

15. The apparatus of claim 14 wherein the clock speed is modulated by the controller as a function of a magnitude of the adverse environmental condition sensed by the one or more sensors.

16. The apparatus of claim 14 wherein the clock speed is modulated by the controller as a function of the duration of the adverse environmental condition sensed by the one or more sensors.

17. The apparatus of claim 10 wherein the display is mounted on packaging of the product.

18. The apparatus of claim 10 wherein the display is mounted at a remote location, and the display is in radio frequency contact with the controller, and the display is configured to serve more than one controller mounted on different product unit packages.

19. The apparatus of claim 18 wherein the display is configured as part of a portable hand-held unit that communicates with respective controllers when the portable hand-held unit is held proximally to the controllers.

20. A method for dynamically displaying and adjusting a product expiration date comprising the steps of:
    attaching an expiration date display to a product, the expiration date display identifying the expiration date for the product;
    setting a default expiration date for the expiration date display;
    sensing one or more conditions of the product;
    adjusting the expiration date on the expiration date display responsive to the one or more sensed conditions of the product;
    setting a predetermined optimal use condition of the product;
    determining whether the product is experiencing the predetermined optimal use condition; and
    displaying an indication that the product is ready for optimal use when the product is experiencing the predetermined optimal use condition.

* * * * *